No. 846,556. PATENTED MAR. 12, 1907.
E. F. DOLLAR.
FISH TRAP.
APPLICATION FILED NOV. 14, 1906.

Witnesses
Jos. F. Collins.
N. C. Healy.

Inventor
E. F. Dollar.
By James Shuly
Attorney

UNITED STATES PATENT OFFICE.

EDWARD F. DOLLAR, OF BLOWING CAVE DISTRICT, GRADY COUNTY, GEORGIA.

FISH-TRAP.

No. 846,556.     Specification of Letters Patent.     Patented March 12, 1907.

Application filed November 14, 1906. Serial No. 343,363.

*To all whom it may concern:*

Be it known that I, EDWARD F. DOLLAR, a citizen of the United States, residing at Blowing Cave District, in the county of Grady and State of Georgia, have invented new and useful Improvements in Fish-Traps, of which the following is a specification.

My invention pertains to fish-traps; and it contemplates the provision of an inexpensive and efficient fish-trap constructed with a view of withstanding for a considerable period the rough usage to which such devices are ordinarily subjected.

The invention will be fully understood from the following description and claim when the same are read in connection with the accompanying drawings, forming part of this specification, in which—

Figure 1:
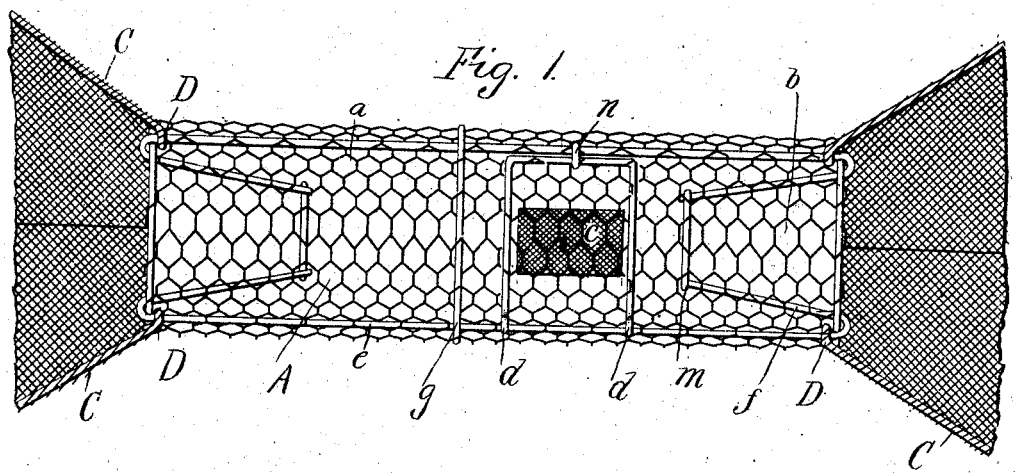
Figure 2:
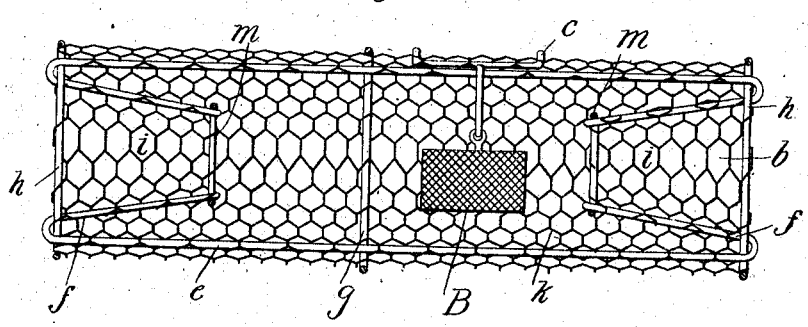
Figure 3:
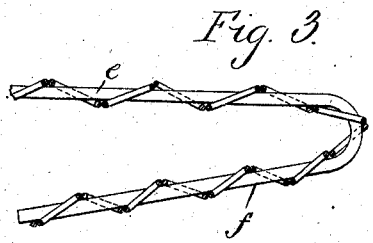
Figure 4:
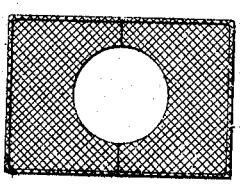

Figure 1 is a plan view of my novel trap as the same appears when in use. Fig. 2 is a longitudinal central section of the cage or pound of the trap. Fig. 3 is a detail view illustrative of the manner in which the entrances to the cage are constructed. Fig. 4 is an end elevation of the trap on a reduced scale.

Similar letters designate corresponding parts in all of the views of the drawings, referring to which—

A is the cage or pound of the trap. This cage or pound comprises a body $a$, having inwardly-contracted entrances $b$ at its ends and a door $c$, which is preferably hinged at $d$ to the body $a$, as illustrated. The body $a$ is made up of longitudinal wires $e$, arranged about the proportional distance illustrated apart and having inturned inwardly-converging portions $f$ at their opposite ends, a circular wire or ring $g$, arranged at about the middle of the body and connected at its ends to one of the longitudinal wires $e$, circular wires or rings $h$, arranged at the ends of the body, and wire-netting $k$. This wire-netting $k$ receives in its interstices the longitudinal wires $e$ and circular wires or rings $g$ and $h$, whereby it is securely connected thereto, and it is provided at the ends of its main portion with inwardly bent and contracted portions $i$, which receive in their interstices the inwardly-converging portions $f$ of the longitudinal wires $e$, whereby they are secured to said portions $f$ and are attached at their ends to rings $m$. The body $a$ as thus constructed is easy to make and is inexpensive, because nothing enters into its construction except the frame-wires and the wire-netting, and yet said body is strong and durable and hence well adapted to withstand the rough usage to which fish-traps are ordinarily subjected. The door $c$ is preferably composed of a wire frame and netting, as illustrated, and is normally held closed through the medium of a suitable catch $n$.

B is a basket, which is detachably connected to and depends from the door $c$. This basket B is designed to hold bait and may be of any construction compatible with the purpose of my invention.

C C are deflectors, the office of which is to guide fish to the entrances of the cage or pound A. These deflectors respectively comprise two longitudinal halves or sections, each of which is formed by a wire frame and wire-netting, as shown, and each half or section is detachably connected to the body of the cage or pound A through the medium of hooks D, which engage longitudinal wires $e$ of the cage or pound A, as shown in Fig. 1. From this it follows that when deemed expedient the cage or pound A may be used without the deflectors or guides C.

In the practical use of the trap bait is placed in the basket B and the trap is arranged, as shown in Fig. 1, in the water. Fish will pass through the contracted entrances of the cage or pound to get at the bait, and hence will be caught and retained in said cage or pound.

The construction shown and described constitutes the present and preferred embodiment of my invention; but I desire it understood that in practice such changes in the form, construction, and arrangement of parts may be made as fairly fall within the scope of my invention as claimed.

Having described my invention, what I claim, and desire to secure by Letters Patent, is—

In a fish-trap, a cage or pound comprising a body made up of longitudinal wires $e$ having inwardly bent and converging, opposite end portions $f$, a ring of wire arranged at the middle of the body, rings of wire arranged at the ends of the body, and wire-netting arranged on the longitudinal wires $e$ and having inwardly-bent end portions which latter serve together with the wire portions $f$ to form contracted entrances at the ends of the body; the intermediate portion of the wire-netting receiving in its interstices the longitudinal wires *e* and the rings of wire, and the inwardly-bent end portions of said netting receiving in their interstices throughout their length the inwardly-bent end portions *f* of said wires *e*, whereby the wire-netting is connected of itself throughout its length to the wires, and a door connected to said body and controlling an opening in the side of the same.

In testimony whereof I have hereunto set my hand in presence of two subscribing witnesses.

EDWARD F. DOLLAR.

Witnesses:
  J. W. NICHOLSON,
  C. R. GOTHIRE.